US005969781A

United States Patent [19]

Matsuyama et al.

[11] Patent Number: 5,969,781

[45] Date of Patent: Oct. 19, 1999

[54] HOMEOTROPIC LIQUID CRYSTAL DISPLAY WITH COMMON ELECTRODES PARALLEL AND POSITIONED AT BOTH SIDES OF PIXEL ELECTRODES TO IMPROVE VIEWING ANGLE

[75] Inventors: Hiroaki Matsuyama; Shinichi Nishida, both of Tokyo, Japan

[73] Assignee: NEC Corporation, Tokyo, Japan

[21] Appl. No.: 09/108,094

[22] Filed: Jun. 30, 1998

[30] Foreign Application Priority Data

Jun. 30, 1997 [JP] Japan .................................... 9-173662

[51] Int. Cl.[6] ........................ G02F 1/1337; G02F 1/1343

[52] U.S. Cl. ............................................ 349/130; 349/143

[58] Field of Search ............................. 349/88, 141, 169, 349/143, 147, 130

[56] References Cited

U.S. PATENT DOCUMENTS

| | | | |
|---|---|---|---|
| 5,532,854 | 7/1996 | Fergason | 349/200 |
| 5,777,711 | 7/1998 | Sugiyama | 349/143 |
| 5,831,700 | 11/1998 | Li et al. | 349/88 |
| 5,835,177 | 10/1998 | Dohjo et al. | 349/147 |
| 5,847,798 | 12/1998 | Yang et al. | 349/169 |

FOREIGN PATENT DOCUMENTS

| | | |
|---|---|---|
| 227 809 A1 | 9/1985 | Germany . |
| 53-48542 | 5/1978 | Japan . |
| 53-89753 | 8/1978 | Japan . |
| 56-88179 | 7/1981 | Japan . |
| 60-217336 | 10/1985 | Japan . |
| 6-160878 | 6/1994 | Japan . |
| 6-273803 | 9/1994 | Japan . |
| 7-56148 | 3/1995 | Japan . |

*Primary Examiner*—William L. Sikes
*Assistant Examiner*—Heidi L. Eisenhut
*Attorney, Agent, or Firm*—Scully, Scott, Murphy & Presser

[57] ABSTRACT

An LCD (Liquid Crystal Display) of the present invention includes a pair of substrates facing each other and at least one of which is transparent. A liquid crystal composition intervenes between the substrates. Scanning wirings and signal wirings are arranged on one substrate in a matrix configuration. Pixel electrodes each constitutes one pixel. Switching devices each is positioned at a portion where one of the scanning wirings and one of the signal wirings intersect each other, for controlling the application of a voltage to the associated pixel electrode. Common electrodes are formed on the other substrate. The liquid crystal composition has positive dielectric constant anisotropy and is oriented vertically to the facing surfaces of the substrates when a voltage is not applied. The common electrodes are parallel to the pixel electrodes and positioned at both sides of said pixel electrodes.

12 Claims, 9 Drawing Sheets

HOMEOTROPIC LIQUID CRYSTAL DISPLAY WITH COMMON ELECTRODES PARALLEL AND POSITIONED AT BOTH SIDES OF PIXEL ELECTRODES TO IMPROVE VIEWING ANGLE

BACKGROUND OF THE INVENTION

The present invention relates to an active matrix liquid LCD (Liquid Crystal Display) and, more particularly to an LCD with an improved display characteristic.

An active matrix LCD of the type using a twisted nematic (TN) system is extensively used. This type of LCD includes a pair of transparent electrodes for driving a liquid crystal layer. The pair of electrodes are respectively arranged face-to-face on a pair of substrates. An electric field is applied to the liquid crystal layer in a direction substantially perpendicular to the surfaces of the substrates, thereby controlling the orientation of liquid crystal. In an active matrix drive system, pixels are arranged in a matrix in regions defined by a plurality of scanning wirings and signal wirings. A single switching device is assigned to each of the pixels. Signals are sequentially fed to the scanning wirings and signal wirings in order to operate the switching devices belonging to the pixels selected. The active matrix drive system realizes a high definition LCD having a great number of pixels.

However, the problem with the active matrix LCD is that because the liquid crystal molecules rotate in the direction substantially perpendicular to the substrates, transmissivity varies in accordance with the rotation angle of the molecules and therefore with the direction in which the LCD is seen. As a result, brightness noticeably changes with a change in the viewing direction and renders the display of halftone difficult while reducing view angle. Moreover, because twisted orientation exists in a plane parallel to the substrates, the molecules are subjected to restriction in the direction of twist when rotating in the vertical direction. The rotation therefore needs a substantial period of time to complete and reduces the response speed for display.

There is an increasing demand for an implementation for reducing dependency on view angle due to the increasing screen size of an LCD. Because the angle to a given visual point differs from one region to another region of the screen, display particularly differs from one edge to the other edge when a change in brightness or color ascribable to view angle is great. If dependency on view angle is small, then it is possible to display information evenly without regard to view angle, i.e., to allow two or more persons to recognize the information in the same condition. Today, there is an increasing demand for the display of a moving picture as distinguished from a still picture. A low response speed for display causes the previous image, i.e., to remain at the time of switching of display as a residual image. To display a moving image in an easily recognizable condition, it is necessary to increase the response speed in order to reduce the residual image.

In light of the above, an LCD capable of applying an electric field to a liquid crystal layer in a direction substantially parallel to substrates so as to control the orientation of liquid crystal is available, as disclosed in, e.g., Japanese Patent Laid-Open Publication Nos. 56-88179 and 6-273803. However, an LCD taught in Laid-Open Publication No. 56-88179 has a problem that when it is driven by the active matrix scheme, scanning wirings and signal wirings should be arranged in parallel to or perpendicularly to electrodes. As a result, the orientation of the liquid crystal is disturbed by the potentials of the wirings, rendering the display characteristic of the LCD defective. The LCD taught in Laid-Open Publication No. 6-273803 allows liquid crystal molecules to rotate in a plane parallel to substrates and thereby reduces the variation of transmissivity ascribable to view angle as far as possible, so that a desirable view angle characteristic is achievable. However, the problem with this LCD is that a heavy load acts on the liquid crystal molecules during rotation in the plan parallel to the substrates and thereby lowers the response speed.

Technologies relating to the present invention are also disclosed in, e.g., Japanese Patent Laid-Open Publication Nos. 6-160878 and 7-56148 and Proceedings of 19th Liquid Crystal Forum, pp. 308–309, September 1993.

SUMMARY OF THE INVENTION

It is therefore an object of the present invention to provide an active matrix LCD having a wide view angle and high response speed.

An LCD of the present invention includes a pair of substrates facing each other and at least one of which is transparent. A liquid crystal composition intervenes between the substrates. Scanning wirings and signal wirings are arranged on one substrate in a matrix configuration. Pixel electrodes each constitutes one pixel. Switching devices each is positioned at a portion where one of the scanning wirings and one of the signal wirings intersect each other, for controlling the application of a voltage to the associated pixel electrode. Common electrodes are formed on the other substrate. The liquid crystal composition has positive dielectric constant anisotropy and is oriented vertically to the facing surfaces of the substrates when a voltage is not applied. The common electrodes are parallel to the pixel electrodes and positioned at both sides of said pixel electrodes.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1:
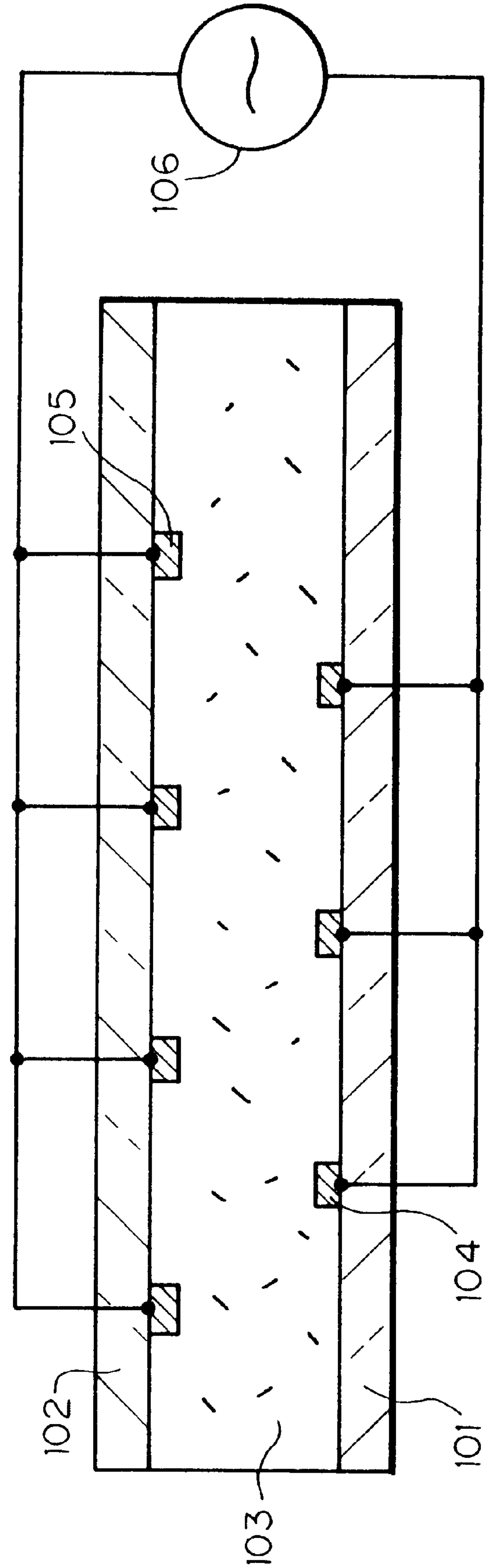
FIGS. 1 and 2 each shows a particular conventional LCD.

To better understand the present invention, brief reference will be made to a conventional LCD of the type controlling the orientation of liquid crystal by applying an electric field to a liquid crystal layer substantially in parallel to substrates, as disclosed in, e.g., Laid-Open Publication No. 56-88179 mentioned earlier. As shown in FIG. 1, the LCD includes a pair of substrates 101 and 102 holding a liquid crystal composition 103 therebetween. Electrodes 104 and electrodes 105 are arranged on the substrates 101 and 102, respectively. A voltage is applied from a power source 106 to the electrodes 104 and 105 so as to form an inclined electric field. The inclined electric field unconditionally defines the array angle of the liquid crystal, so that the variation of hue ascribable to the variation of the field strength and that of temperature is stabilized.

Figure 2A:
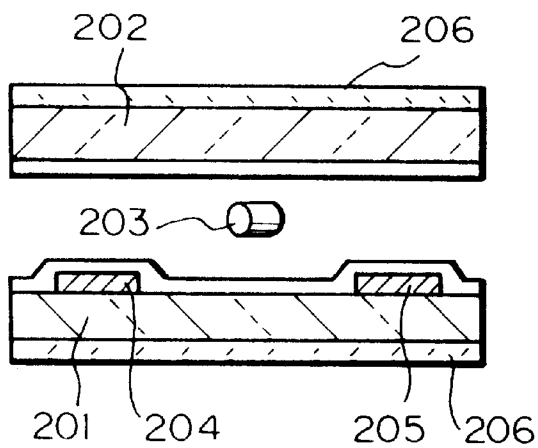
Figure 2B:
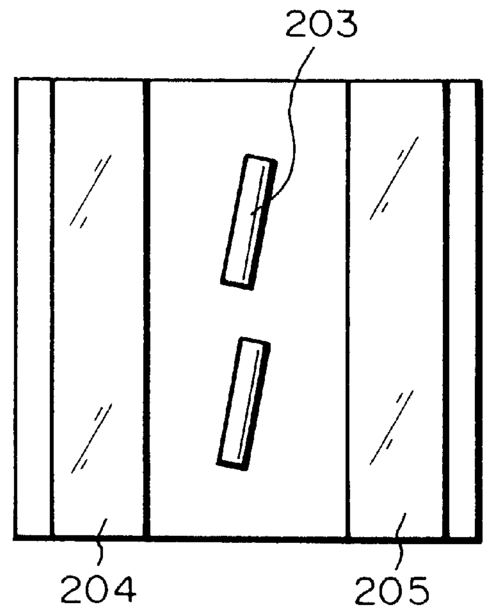
Figure 2C:
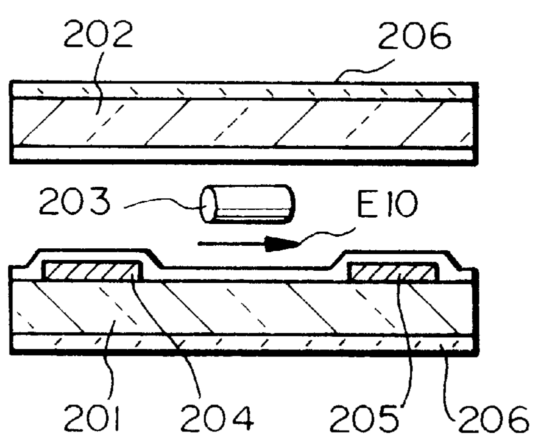
Figure 2D:
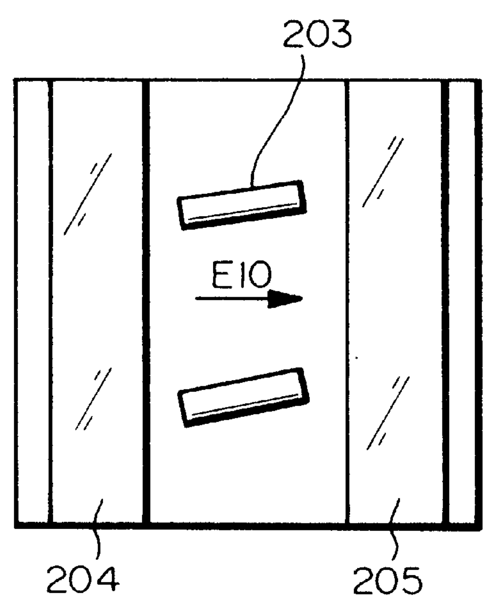

FIGS. 2A–2D show an LCD taught in Laid-Open Publication No. 6-273803 also mentioned earlier. FIGS. 2A and 2B are respectively a section and a plan view showing a condition in which a voltage is not applied to the LCD. FIGS. 2A and 2B are respectively a section and a plan view showing a condition in which a voltage is applied to the LCD. As shown, the LCD includes a pair of substrates 201 and 202 holding a liquid crystal composition 203 therebetween. The substrates 201 and 202 each is provided with a polarizer 206 and an alignment layer 207. In the condition shown in FIGS. 2A and 2B, a liquid crystal molecule 203 is oriented approximately parallel to electrodes 204 and 205. In the condition shown in FIGS. 2C and 2D, a voltage applied to the LCD causes the molecule 203 to rotate in a direction parallel to an electric field E10, i.e., perpendicular to the electrodes 204 and 205. Therefore, by arranging the polarizers 206 in a preselected angle, it is possible to vary the relative transmissivity with the voltage. Because the liquid crystal molecule 203 is rotated in a plane parallel to the substrates 201 and 202, there can be reduced the variation of transmissivity ascribable to view angle and particular to an LCD of the type causing liquid crystal molecules to rotate perpendicularly to substrates. Such an LCD achieves a desirable view angle characteristic. This makes it needless to divide the orientation of the molecules in the up-and-down or right-and-left direction within a single pixel for correcting the variation of transmissivity ascribable to view angle.

The above conventional LCDs each has the previously discussed problem left unsolved.

Figure 3:
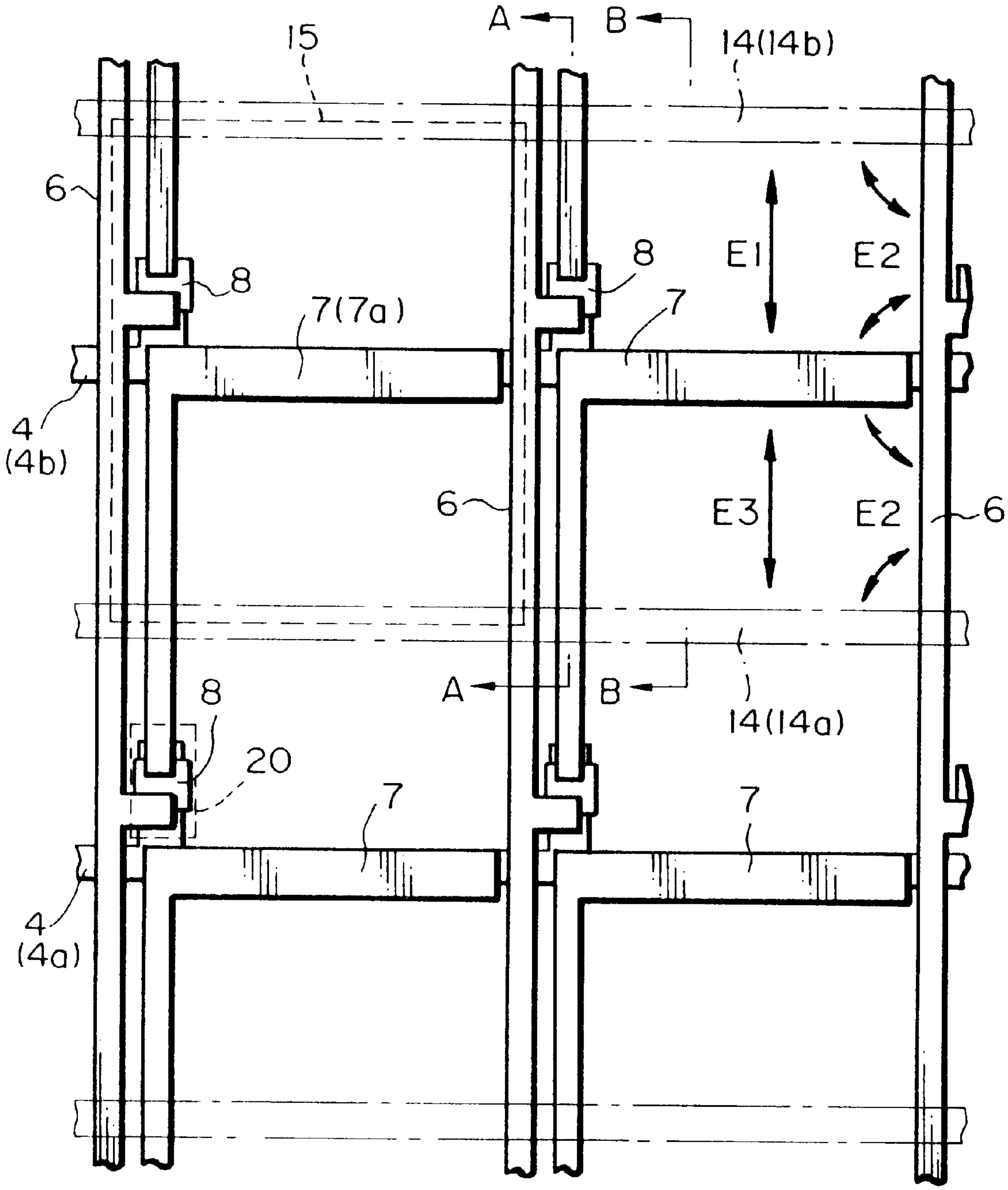
FIG. 3 is a plan view showing an LCD embodying the present invention.
Figure 4A:
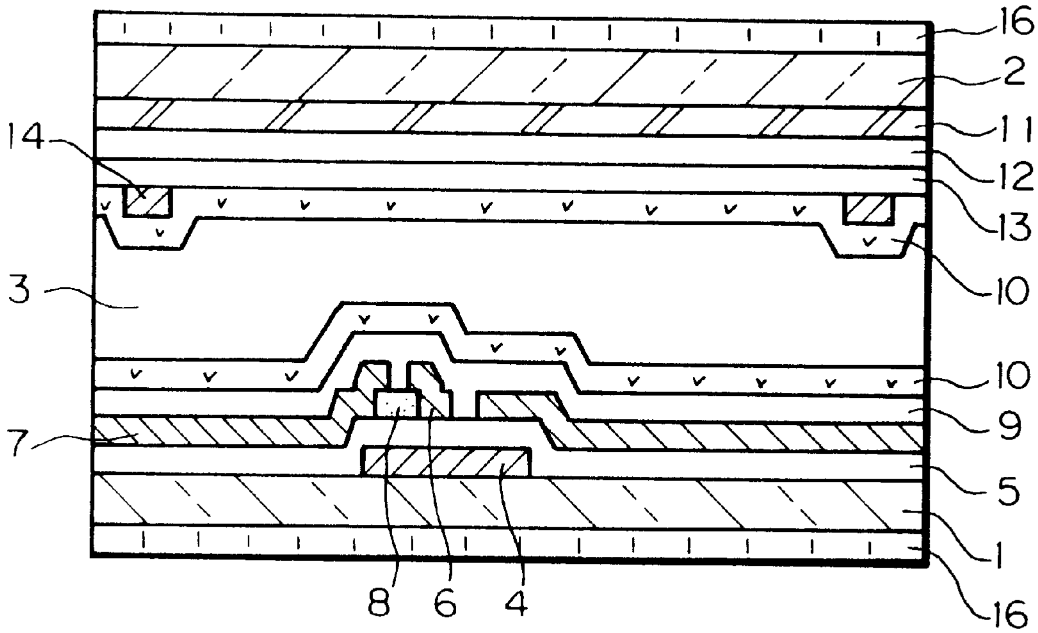
FIGS. 4A and 4B are sections along lines A—A and B—B of FIG. 3, respectively.
Figure 4B:
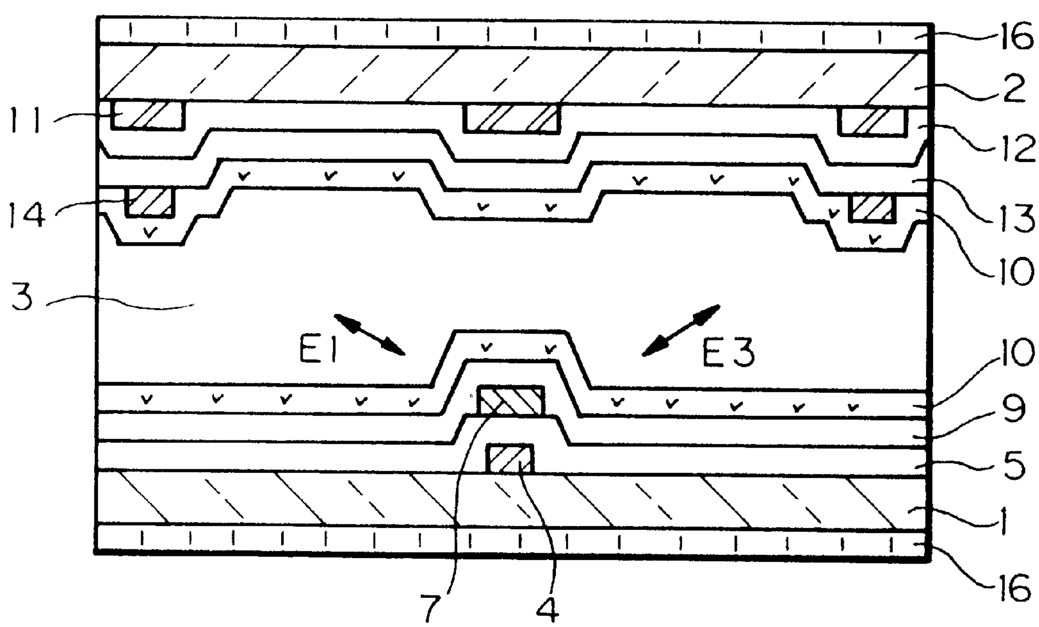

Referring to FIGS. 3, 4A and 4B, an LCD embodying the present invention is shown and includes a pair of transparent glass substrates 1 and 2. The glass substrates 1 and 2 are spaced from each other by a gap of about 5 μm and hold a liquid crystal composition 3 therebetween. The composition 3 has refractive index anisotropy Δn of about 0.11 (589 nm; 20° C.) and dielectric constant anisotropy Δε of about positive 11.0 (20° C.). Scanning wirings 4 are arranged on the substrate 1, and each is implemented as a gate electrode in the form of a double layer of ITO and chromium. The scanning wirings 4 are arranged at a pitch of about 30 μm, and each has a width of about 5 μm. An insulation film 5 is formed on the substrate 1 over the wirings 4 and implemented as a double layer of silicon oxide and silicon nitride. An semiconductor layer 8 is formed on the insulation film 5 by use of amorphous silicon. Further, signal wirings 6 each being about 5 μm wide are formed at a pitch of about 30 μm, and each is implemented as a drain electrode in the form of a double layer of low resistance ITO and chromium. The scanning wirings 4 and signal wirings 6 perpendicularly intersect each other in a matrix configuration. Pixel electrodes 7 serving as source electrodes at the same time are formed of ITO. As a result, switching devices 20 in the form of TFTs (Thin Film Transistors) are formed. The pixel electrodes 7 each extends along one scanning wiring 4 to be scanned immediately before the scanning wiring 4 to which the associated switching device 20 belongs, and in addition covers the above scanning line 4. A silicon nitride protection film 9 is formed on the pixel electrodes 7 and is covered with a polyimid vertical alignment layer 10.

On the other hand, a light shield layer 11 is formed on the portion of the glass substrate 2 overlying the switching devices 20, scanning wirings 4, signal wirings 6, and pixel electrodes 7. The light shield layer 11 is implemented by acrylic resin with carbon black dispersed therein, i.e., so-called resin black. A color layer 12 is formed on the light shield layer 11 by use of acrylic resin colored by a pigment. It is to be noted that the color layer 12 is not necessary in the case of black-and-white display. A silicon nitride protection layer 13 is formed on the color layer 12. Common electrodes 14 are formed on the protection layer 13 by use of ITO and spaced from the pixel electrodes 7 by a gap of about 10 μm. Nearby common electrodes 14 are equally spaced from the adjoining pixel electrode 7 covering the scanning wiring 4, i.e., they are positioned at both sides of the scanning wiring 4. In this configuration, a portion 15 delimited by a dashed line in FIG. 3 constitutes a single pixel 15. Further, an alignment layer 10 is formed in the form of a polyimid vertical alignment layer. A polarizer 16 is adhered to the outside of each of the glass substrates 1 and 2 and implemented by an optical film. The absorption axis of each polarizer 16 is inclined by 45° relative to the scanning wirings 4 while the absorption axes of the two polarizers 16 are perpendicular to each other. Each polarizer 16 may have a double layer structure consisting of an upper layer and a lower layer implemented as a polarizer and a phase difference film, respectively. The phase difference film is used to, e.g., reduce the reversal of black display to white when seen from an oblique view field.

Figure 5:
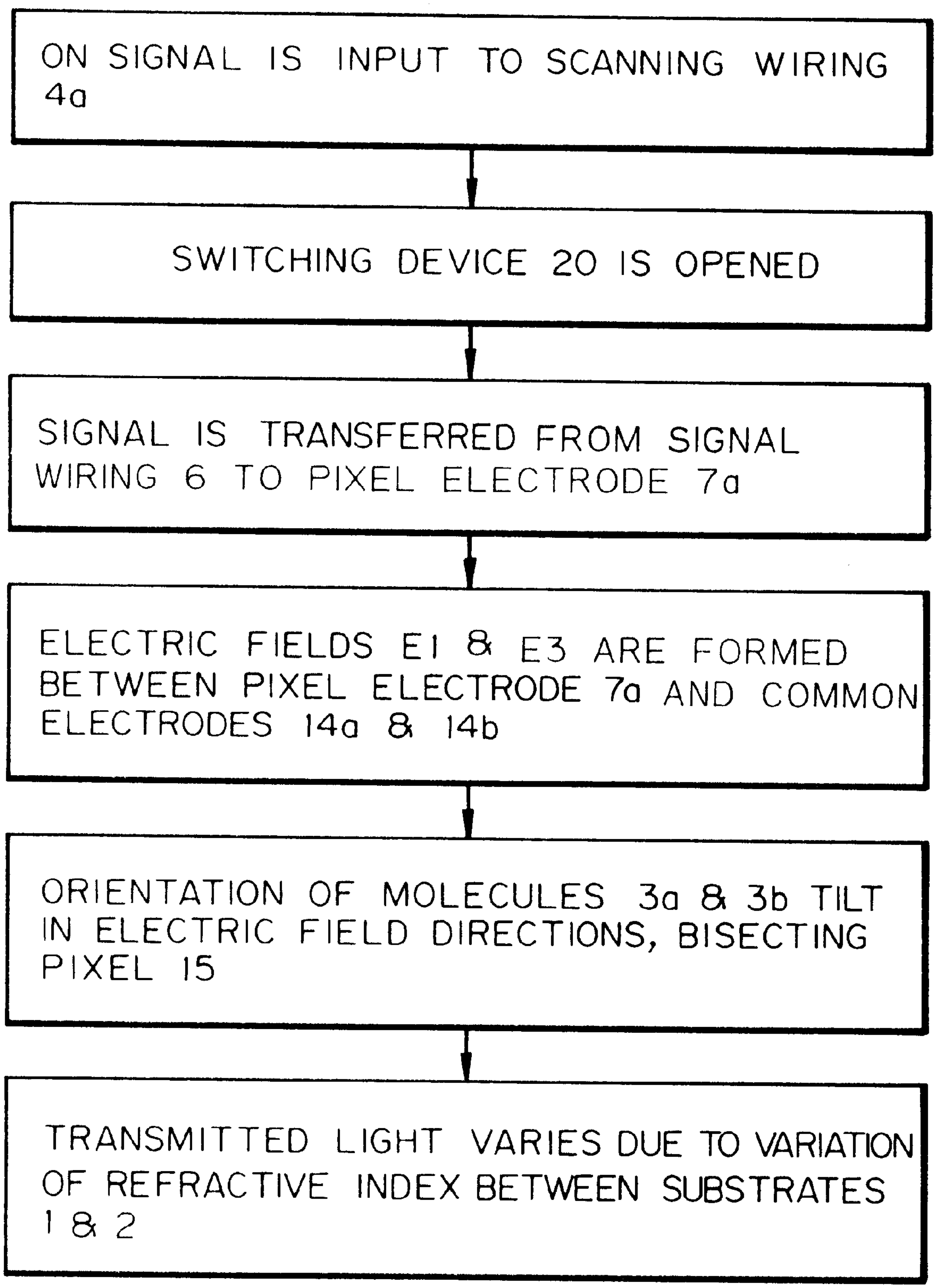
FIG. 5 is a flowchart demonstrating the operation of the LCD shown in FIG. 3
Figure 6A:
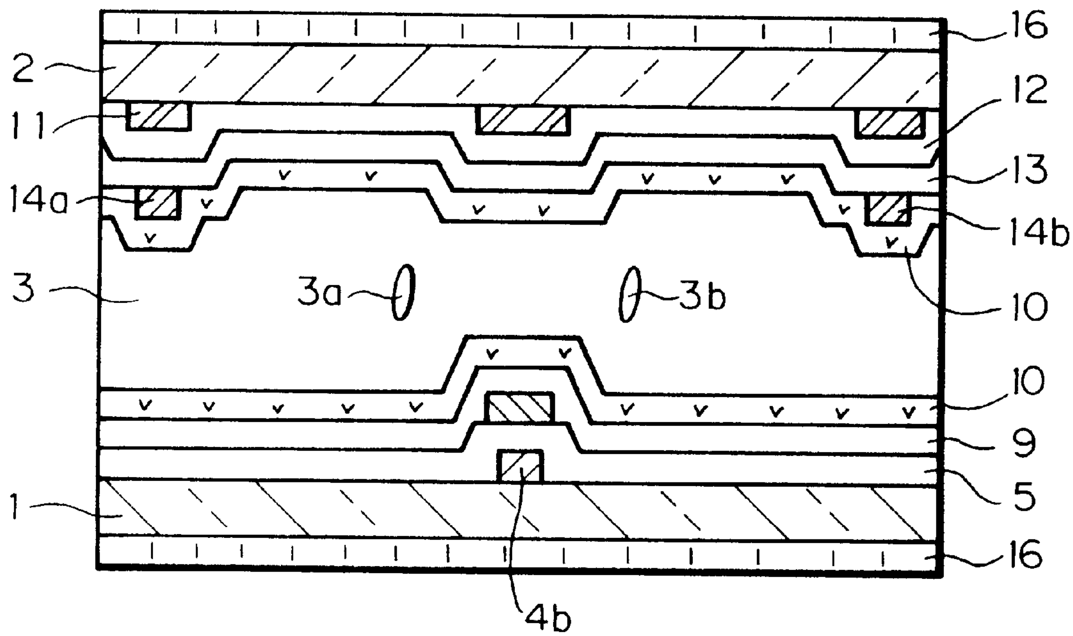
FIGS. 6A and 6B are views corresponding to FIG. 4B, showing the operation of the above embodiment.
Figure 6B:
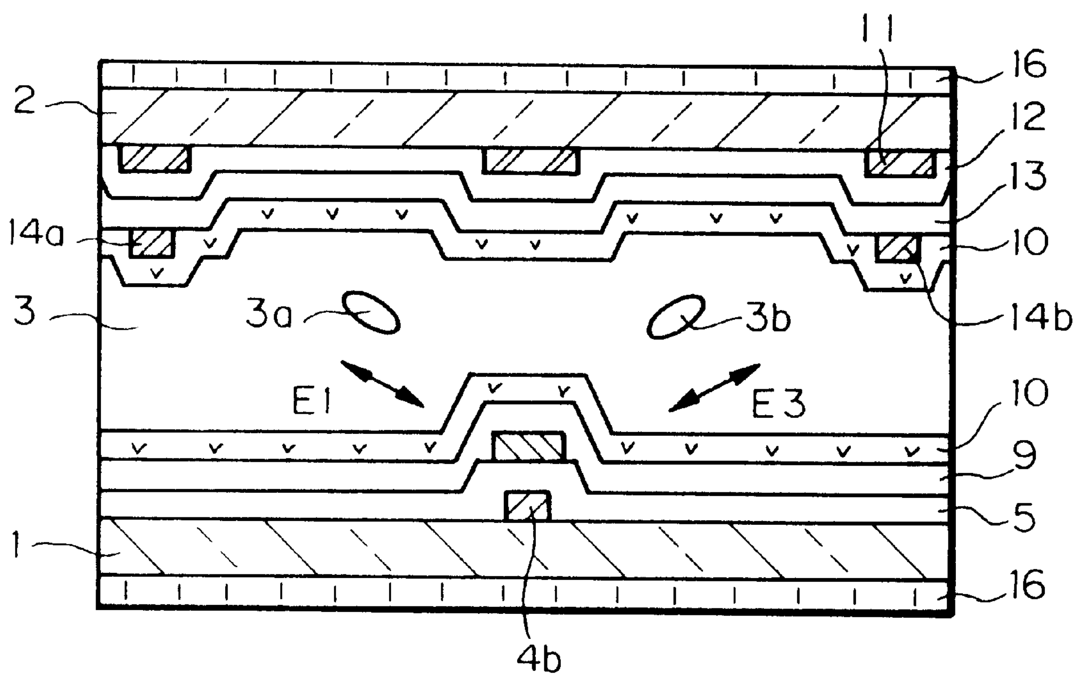

Reference will be made to FIGS. 5, 6A and 6B for describing the operation of the illustrative embodiment. FIG. 6A shows a condition in which a potential difference between the pixel electrodes 7 and the common electrodes 14 is too small to effect the movement of the liquid crystal composition 3. FIG. 6B shows another condition in which the above potential difference is great enough to cause the composition 3 to move.

Let attention be paid to a scanning wiring 4a shown in FIG. 3. When an ON signal, i.e., a voltage high enough to open the switching device 20 associated with the scanning wiring 4*a* is applied to the wiring 4*a*, the signal on the wiring 4*a* is transferred to a pixel electrode 7*a*. As shown in FIG. 6A, assume that a difference between the potential of the pixel electrode 7*a* derived from the signal on the signal wiring 6 and the potential of common electrodes 14*a* and 14*b* is too small to effect the movement of the composition 3. Then, liquid crystal molecules 3*a* and 3*b* remain in vertical or original orientation. At this instant, light propagates through the liquid crystal layer in an isotropic phase. However, transmitted light is largely absorbed due to the unique arrangement of the polarizers 16, causing the display to appear black.

As shown in FIG. 6B, when the above potential difference becomes high enough to cause the composition 3 to move, vertically oriented liquid crystal molecules 3*a* and 3*b* tilt and become respectively parallel to electric fields E1 and E3 formed between the common electrodes 14*a* and 14*b*. At this time, the transmitted light begins to shift from the absorption axis of the polarizer due to the refractive index anisotropy of the liquid crystal layer. As a result, the light is transmitted through the polarizer. That is, brightness increases and allows tonality to be displayed. Because the electric fields E1 and E3 have the same strength, the molecules 3*a* and 3*b* tilt by the same angle relative to the substrate, but in directions different by 180° from each other. Consequently, the orientation is bisected within the pixel 15, FIG. 3, at the pixel electrode 7*a*, allowing the variation of transmissivity dependent on view angle to be corrected and reduced. This successfully reduces view angle dependency and thereby insures a desirable view angle characteristic. Further, because the molecules 3*a* and 3*b* do not have twisted orientation particular to the TN system, they tilt rapidly and insure a desirable display characteristic including rapid response and a minimum of residual image.

A relation between the liquid crystal composition and the LCD is as follows. The pixel 15 has its area determined by the pitch of the signal wirings 6 and the distance between each pixel electrode 7 and two nearby common electrodes 14 adjoining it. The above distance is limited in the design aspect and dependent on the size of dielectric constant anisotropy of the liquid crystal composition. The field strength can be reduced with a decrease in the dielectric constant anisotropy of the composition. Because the field strength is proportional to the potential difference between the electrodes and inversely proportional to the distance between the electrodes, the distance can be increased with an increase in dielectric constant anisotropy so long as the drive voltage is constant. A greater distance between the electrodes desirably translates into a greater aperture ratio and greater transmissivity. By increasing the distance between the electrodes, it is possible to reduce the number of electrodes arranged in a single pixel. While the electrodes shield transmitted light and therefore render the display darker when increased in number, the aperture ratio and transmissivity can be increased if the distance between the electrodes is increased and if the number of electrodes is reduced.

As far as the illustrative embodiment with bisected orientation and desirable view angle characteristic is concerned, the above structure in which a single pixel electrode and two common electrodes are arranged in each pixel is best; the common electrodes are shared by nearby pixels. If the distance between the electrodes is sufficiently great for drive, then dielectric constant anisotropy can be further increased in order to lower drive voltage. Low drive voltage is desirable from the energy saving and portability standpoint.

While a liquid crystal component has positive or negative dielectric constant anisotropy, greater dielectric constant anisotropy in absolute value is achievable with a positive liquid crystal. For this reason, the illustrative embodiment uses a liquid crystal component having positive dielectric constant anisotropy. The illustrative embodiment achieves rapid response with vertical orientation, as stated earlier. Further, vertical orientation is advantageous in that a display characteristic with the greatest change in transmissivity, i.e., high contrast is attainable with the combination of the electrode structure capable of forming electric fields between the pixel electrode and the common electrodes of the other substrate and the liquid crystal composition having positive dielectric constant anisotropy.

Referring again to FIG. 3, the structure of the pixel electrodes and scanning wirings and the drive system will be described more specifically. A scanning wiring 4*b* is covered with the pixel electrode 7*a*. This configuration allows the pixel electrode 7*a* to operate at the intermediate position of the pixel 15 and equally divide the orientation region of the liquid crystal composition, and shields the electric field formed by the scanning line and having the greatest voltage amplitude to thereby reduce disturbance to the orientation. However, for the same reasons, when the pixel electrode 7 to be operated by a given switching device 20 is laid on the scanning wiring 4 to which the switching device 20 belongs, the pixel electrode 7 cannot hold a voltage stably. Specifically, the switching device 20 is opened by a high voltage applied to the scanning wiring 4 so as to charge the pixel electrode 7, and then closed by a low voltage applied to the same wiring 4 so as to cause the electrode 7 to hold the voltage. However, because the potential of the scanning wiring 4 drops just after charging, the potential held by the pixel electrode 7 is absorbed by an electric field formed between the wiring 4 and the pixel 7.

In light of the above, as shown in FIG. 3, the pixel electrode 7*a* belonging to a given switching element 20 covers the scanning wiring 4*b* to be scanned immediately before the scanning wiring 4*a* belonging to the switching device 20. Therefore, the scanning wiring 4*b* is free from voltage amplitude at and around the time of voltage application to the pixel electrode 7, allowing the electrode 7 to hold a voltage stably. It follows that the structure in which a single pixel is bisected in orientation is applicable to the active matrix drive system implementing high definition.

In the illustrative embodiment, the liquid crystal composition having refractive index anisotropy $\Delta\epsilon$ as great as about positive 11.0 allowed a drive voltage as low as about 6 V to implement contrast of about 140. A liquid crystal composition having dielectric constant anisotropy $\Delta\epsilon$ as small as about 5.0 failed to implement contrast of 140 even when the drive voltage was as high as about 10 V. The LCD achieved low drive voltage and high contrast when the dielectric constant anisotropy of the composition was greater than 10 inclusive. A conventional TN type active matrix LCD has a view angle (implementing contrast above 5) which is 25° upward or 50° C. downward, rightward and leftward, and has a response speed of 80 ms (sum of a period of time necessary for white-to-black reversal and a period of time necessary for black-to-white reversal). By contrast, the illustrative embodiment realizes a view angle of more than 50° in all directions and a response speed of less than 40 ms inclusive, noticeably improving the display characteristic.

Figure 7:
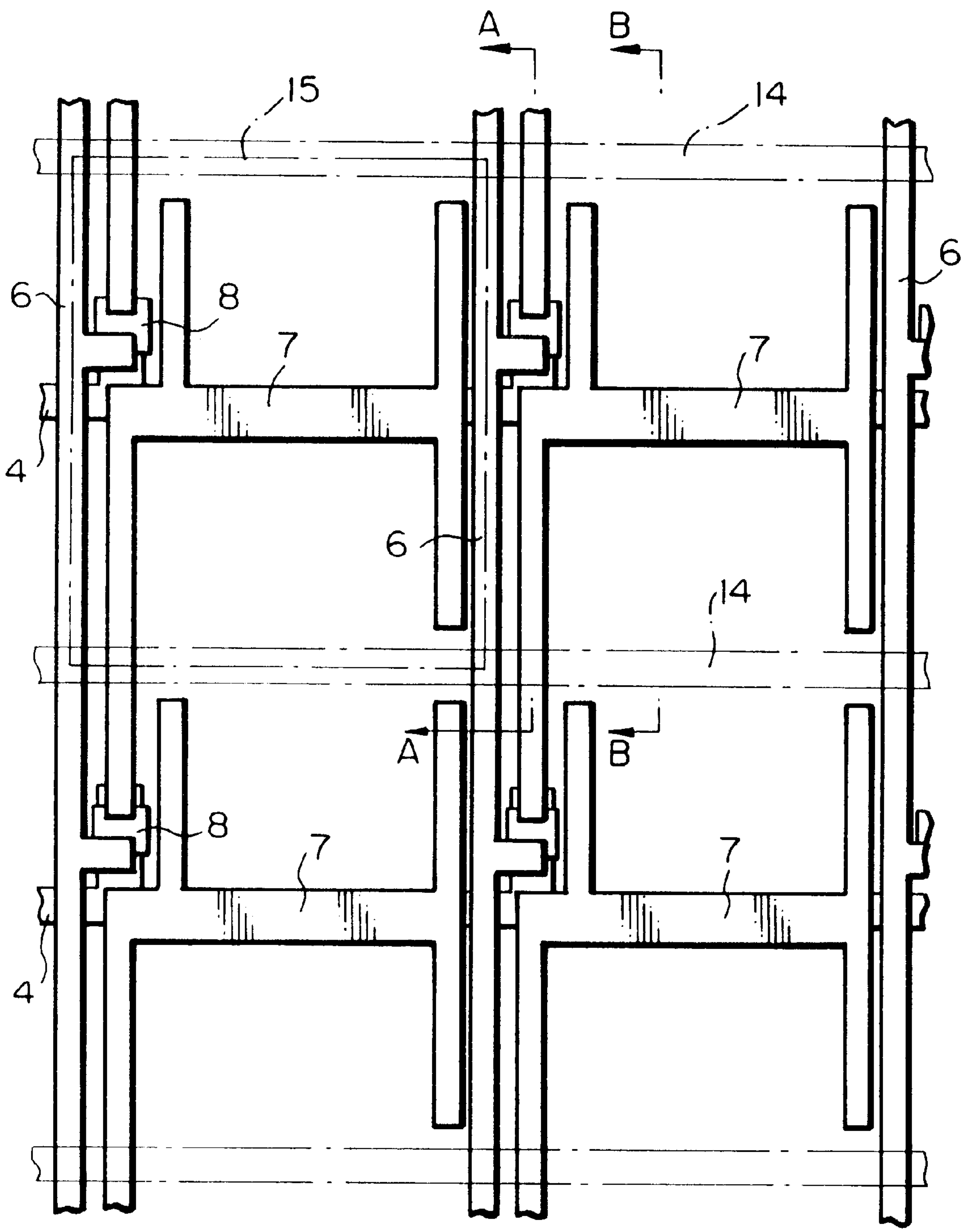
FIG. 7 is a plan view showing an alternative embodiment of the present invention.
Figure 8A:
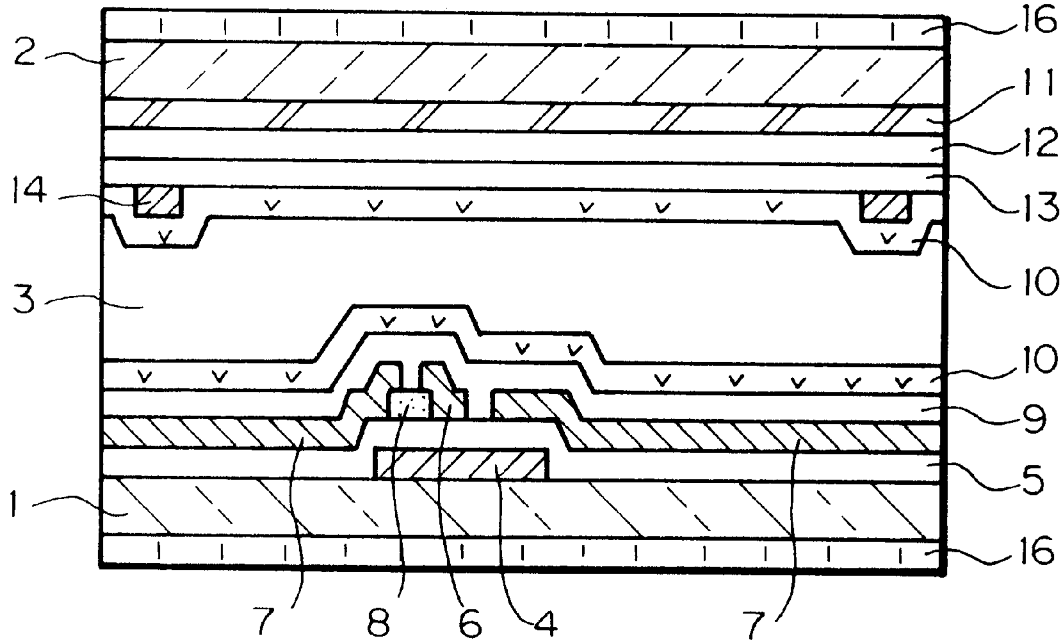
FIGS. 8A and 8B are sections along lines A—A and B—B of FIG. 7, respectively.
Figure 8B:
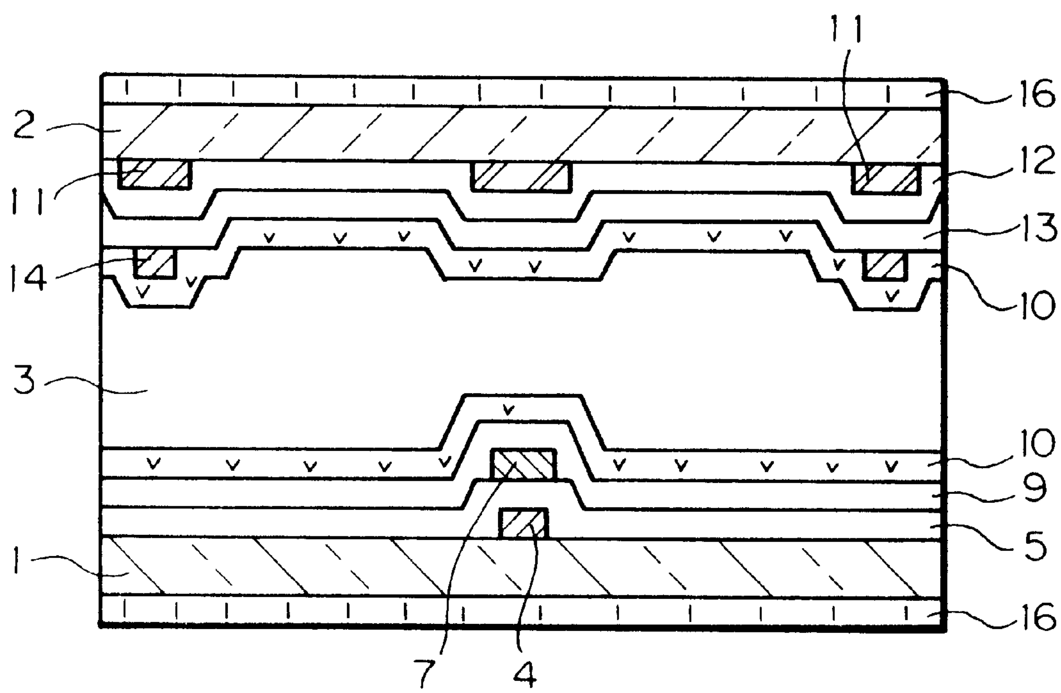

An alternative embodiment of the present invention will be described with reference to FIGS. 7, 8A and 8B. This embodiment is identical with the previous embodiment except that each pixel electrode 7 is generally configured in the form of a letter H. As shown, a part of the pixel electrode 7 extending from the switching device 20 positioned in a given pixel forms a shield line for the portion of the adjoining pixel where the electrode 7 is arranged and the signal wirings 6 positioned at both sides of the pixel. Such an alternative configuration successfully stabilizes the electric field distribution in the pixel and desirable bisected orientation. This embodiment implements contrast of about 180 which is even higher than the contrast attainable with the previous embodiment.

In the above embodiments, the substrates are spaced by a distance d of about 5 μm, the pixel electrodes and common electrodes each has a width of about 5 μm, and the pixel electrodes and common electrodes are spaced by a distance L of about 10 μm. Therefore, $\tan^{-1}[/(w+L)]$ is about 10° and satisfies the following condition representative of a desirable display characteristic:

$$10°<\tan -1[d/(w+L)]<30°$$

When the above distance L was about 10 μm to about 30 μm, i.e., when $\tan^{-1}[(d/W+L)]$ is about 8°, the drive voltage was higher than 10 V inclusive and effected the withstanding voltage of switching devices to such a degree that active matrix drive was impracticable. Further, when the distance L was about 8 $\mu$m, i.e., when $\tan^{-1}[d/(w+L)]$ was about 32°, the view angle was less than 30° upward and downward and deteriorated the display characteristic. It was therefore determined that a high definition, matrix drive LCD with a desirable view angle characteristic is achievable so long as the following condition is satisfied:

$$10° < \tan^{-1}[d/(w+L)] < 30°$$

Figure 9:
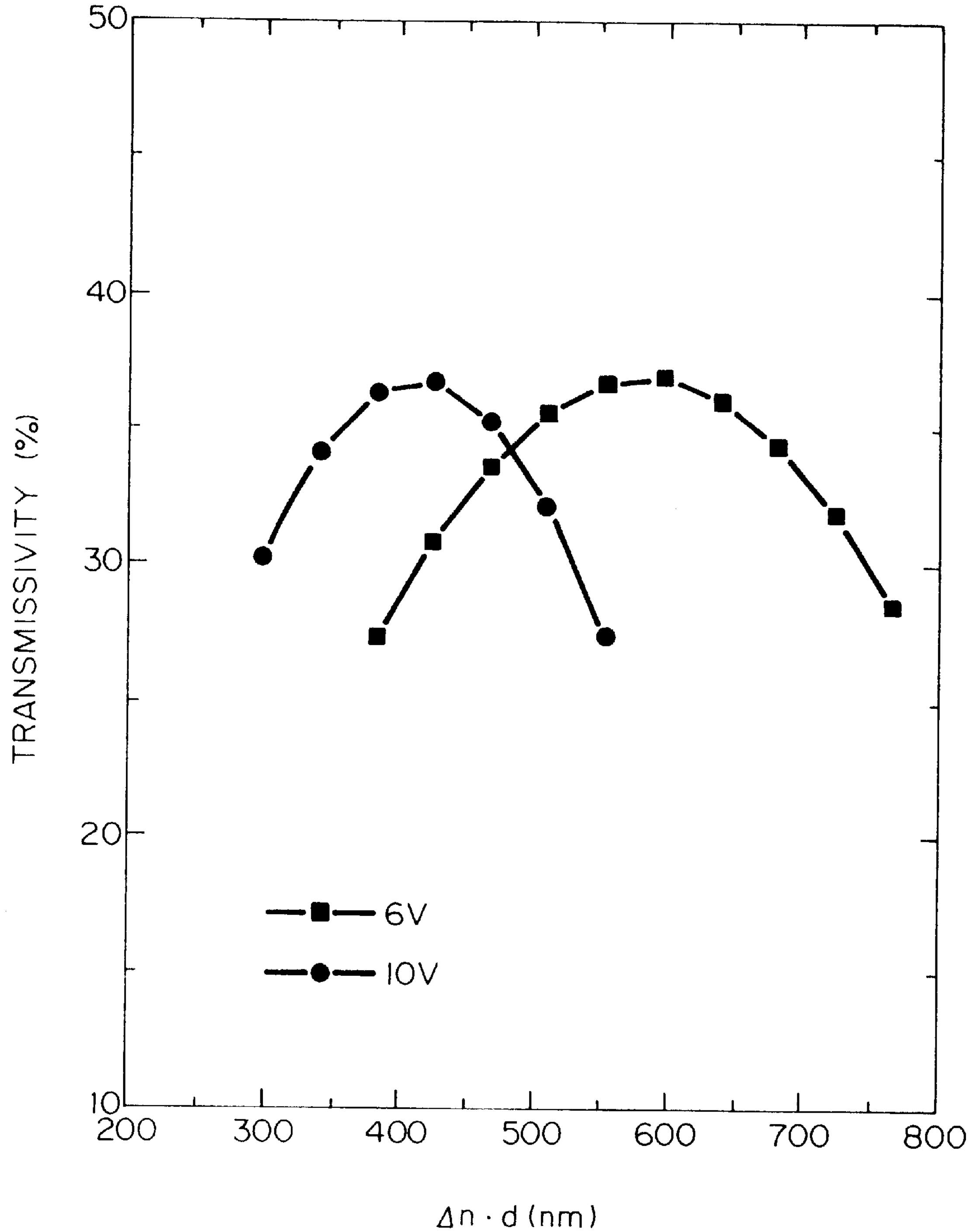
FIG. 9 is a graph showing an optical characteristic particular to the present invention.

Reference will be made to FIG. 9 for describing the optimization of the refractive index anisotropy $\Delta\epsilon$ of the liquid crystal composition and the distance d between the substrates holding the substance therebetween. FIG. 9 shows on its abscissa the product of the refractive index anisotropy $\Delta n$ of the composition and the distance d between the substrates, and shows transmissivity on its ordinate. Specifically, in the illustrative embodiments, the refractive index anisotropy $\Delta n$ was varied in order to measure the transmissivity with respect to drive voltages of 6 V and 10 V. As shown, when the drive voltage is 10 V lying in the withstanding range of the switching devices, transmissivity sharply decreases when the product $\Delta n \cdot d$ is reduced below 350 nm. When the drive voltage is 6 V, the maximum transmissivity shifts to the side where $\Delta \cdot d$ increases; transmissivity sharply decreases when the product $\Delta \cdot d$ is increased above 70 nm. When the drive voltage is lower than 6 V, the maximum transmissivity further shifts to the side where $\Delta n \cdot d$ increases, but the view angle is reduced due to a decrease in the inclination of the orientation of the liquid crystal composition. It is therefore necessary to set $\Delta n$ and d under the following condition:

$$350 \text{ nm} < \Delta n \cdot d < 700 \text{ nm}$$

In the illustrative embodiments, $\Delta n \cdot d$ is selected to be 550 nm and insures the optimal transmissivity characteristic for the drive voltage of 6 V.

In summary, it will be seen that the present invention provides an LCD having various unprecedented advantages, as enumerated below.

(1) The LCD has desirable characteristics including a view angle. Specifically, the direction in which a liquid crystal composition tilts due to an electric field is bisected within each pixel in order to reduce the variation of transmissivity dependent on the viewing angle. Therefore, the dependency of tonality reversal, hue variation and so forth on view angle is reduced.

(2) A minimum of residual image occurs when display is switched because the liquid crystal composition has vertical orientation, as distinguished from twisted orientation, and therefore enhances rapid response.

(3) The LCD achieves high transmissivity and lightness. Specifically, the liquid crystal composition of the LCD has positive dielectric constant anisotropy and implements anisotropy greater than 10 inclusive. It is therefore possible to increase a distance between pixel electrodes and common electrodes in order to reduce the area of a pixel to be occupied by the electrodes. In addition, the refractive index anisotropy of the composition and the distance between substrates are optimized.

(4) The LCD consumes a minimum of power because the liquid crystal composition having positive dielectric constant anisotropy allows anisotropy to be increased by more than 10 and therefore allows the composition to be driven by low voltage.

(5) The LCD achieves high definition because it implements active matrix drive assigning a single switching device to each pixel.

With the above advantages, the LCD of the present invention achieves image quality and display characteristic more desirable than those of the conventional TN type active matrix LCD and is therefore a promising substitute for a CRT.

Various modifications will become possible for those skilled in the art after receiving the teachings of the present disclosure without departing from the scope thereof.

What is claimed is:

1. An LCD comprising:

a pair of substrates facing each other and at least one of which is transparent;

a liquid crystal composition intervening between said pair of substrates;

scanning wirings and signal wirings arranged on one of said pair of substrates in a matrix configuration;

a plurality of pixel electrodes;

switching devices each being positioned at a portion where one of said scanning wirings and one of said signal wirings intersect each other, for controlling application of a voltage to an associated one of said pixel electrodes; and a plurality of common electrodes parallel to each other formed on the other substrate;

wherein said liquid crystal composition has positive dielectric constant anisotropy and is oriented vertically to facing surfaces of said pair of substrates when a voltage is not applied, and wherein adjoining pairs of said common electrodes and adjoining pairs of said signal wirings define pixels, and each of said pixel electrodes is positioned in one of said pixels such that said common electrodes are parallel to said pixel electrodes and are positioned at both sides of said pixel electrodes.

2. An LCD as claimed in claim 1, wherein each of said pixel electrodes is connected to an associated one of said switching devices and extended to one of said scanning wirings to be scanned immediately before an adjoining scanning wiring to which the associated switching device is connected.

3. An LCD as claimed in claim 2, wherein said pixel electrode and said adjoining scanning wiring face in parallel to each other.

4. An LCD as claimed in claim 3, wherein there is satisfied the condition:

$$10° < \tan^{-1}[d/(w+L)] < 30°$$

where d is the distance between said pair of substrates, w is the width of each of said pixel electrodes and said common electrodes, and L is the distance between said pixel electrodes and said common electrodes.

5. An LCD as claimed in claim 4, wherein there is satisfied the condition:

$$350 \text{ nm} < \Delta n \cdot d < 700 \text{ nm}$$

where $\Delta n$ is refractive index anisotropy of said liquid crystal composition.

6. An LCD as claimed in claim 5, wherein said liquid crystal composition has dielectric constant anisotropy $\Delta\epsilon$ satisfying the condition:

$$\Delta\epsilon > 10.$$

7. An LCD as claimed in claim 2, wherein there is satisfied a condition:

$$10° < \tan^{-1}[d/(w+L)] < 30°$$

where d is the distance between said pair of substrates, w is the width of each of said pixel electrodes and said common electrodes, and L is the distance between said pixel electrodes and said common electrodes.

8. An LCD as claimed in claim 2, wherein there is satisfied the condition:

$$350 \text{ nm} < \Delta n \cdot d < 700 \text{ nm}$$

where Δn is refractive index anisotropy of said liquid crystal composition, and d is the distance between said pair of substrates.

9. An LCD as claimed in claim 2, wherein said liquid crystal composition has dielectric constant anisotropy Δϵ satisfying a condition:

$$\Delta\epsilon > 10.$$

10. An LCD as claimed in claim 1, wherein there is satisfied the condition:

$$10° < \tan^{-1}[d/(w+L)] < 30°$$

where d is the distance between said pair of substrates, w is the width of each of said pixel electrodes and said common electrodes, and L is the distance between said pixel electrodes and said common electrodes.

11. An LCD as claimed in claim 1, wherein there is satisfied the condition:

$$350 \text{ nm} < \Delta n \cdot d < 700 \text{ nm}$$

where Δn is refractive index anisotropy of said liquid crystal composition, and d is the distance between said pair of substrates.

12. An LCD as claimed in claim 1, wherein said liquid crystal composition has dielectric constant anisotropy Δϵ satisfying the condition:

$$\Delta\epsilon > 10.$$

* * * * *